United States Patent
Teipen et al.

(10) Patent No.: US 10,330,548 B2
(45) Date of Patent: Jun. 25, 2019

(54) CAPACITIVE PRESSURE DIFFERENCE SENSOR AND METHOD FOR ITS MANUFACTURE

(71) Applicant: Endress + Hauser GmbH + Co. KG, Maulburg (DE)

(72) Inventors: Rafael Teipen, Berlin (DE); Benjamin Lemke, Berlin (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 63 days.

(21) Appl. No.: 15/320,079

(22) PCT Filed: Jun. 8, 2015

(86) PCT No.: PCT/EP2015/062679
§ 371 (c)(1),
(2) Date: Dec. 19, 2016

(87) PCT Pub. No.: WO2015/197344
PCT Pub. Date: Dec. 30, 2015

(65) Prior Publication Data
US 2017/0146416 A1    May 25, 2017

(30) Foreign Application Priority Data
Jun. 23, 2014 (DE) .................. 10 2014 108 748

(51) Int. Cl.
*G01L 13/02* (2006.01)
*G01L 9/00* (2006.01)

(52) U.S. Cl.
CPC .......... *G01L 9/0073* (2013.01); *G01L 13/025* (2013.01)

(58) Field of Classification Search
CPC combination set(s) only.
See application file for complete search history.

(56) References Cited

U.S. PATENT DOCUMENTS 4,445,383 A * 5/1984 Binder .................. G01L 9/0073
                                                        361/283.4
4,581,676 A * 4/1986 Baxter .................. G01L 9/0073
                                                        361/283.4
(Continued)

FOREIGN PATENT DOCUMENTS

DE    3814109 C2   11/1988
DE    3827138 A1   2/1989
(Continued)

OTHER PUBLICATIONS

German Search Report, German Patent Office, Munich, DE, dated Sep. 15, 2014.
(Continued)

*Primary Examiner* — Lisa M Caputo
*Assistant Examiner* — Brandi N Hopkins
(74) *Attorney, Agent, or Firm* — Bacon & Thomas, PLLC (57) ABSTRACT

A pressure difference sensor includes first and second counterelectrodes, a conductive disk between the counterelectrodes, a first insulating layer connecting an outer edge of the disk with an outer edge of the first counterelectrode forming a first pressure chamber, a second insulating layer connecting an outer edge of the disk with an outer edge of the second counterelectrode forming a second pressure chamber, an opening in the first counterelectrode, via which the first pressure chamber is contactable with a first pressure, and an opening in the second counterelectrode, via which the second pressure chamber is contactable with a second pressure. The disk is divided into inner and outer regions, the inner region includes a measuring membrane arranged between the two pressure chambers and an edge region, the inner region forms with each of the counterelectrodes a capacitor having a capacitance dependent on a pressure difference acting on the measuring membrane.

13 Claims, 3 Drawing Sheets

(56) References Cited

U.S. PATENT DOCUMENTS

| | | | | |
|---|---|---|---|---|
| 4,903,532 A | * | 2/1990 | Tamai | G01L 9/0042 |
| | | | | 73/718 |
| 5,042,308 A | * | 8/1991 | Nakamura | G01L 9/0073 |
| | | | | 361/283.4 |
| 5,056,369 A | * | 10/1991 | Tamai | G01L 9/0073 |
| | | | | 361/283.3 |
| 5,134,887 A | | 8/1992 | Bell | |
| 5,343,756 A | * | 9/1994 | Nakamura | G01L 9/0073 |
| | | | | 257/419 |
| 6,295,875 B1 | | 10/2001 | Frick | |
| 7,704,774 B2 | | 4/2010 | Mayer | |
| 8,656,787 B2 | * | 2/2014 | Ishihara | G01L 9/0075 |
| | | | | 361/283.4 |
| 8,800,378 B2 | * | 8/2014 | Kopp | G01L 9/0072 |
| | | | | 73/753 |
| 2005/0156241 A1 | | 7/2005 | Sakai | |
| 2006/0063354 A1 | | 3/2006 | Fortin | |

FOREIGN PATENT DOCUMENTS

| | | |
|---|---|---|
| DE | 4124662 A1 | 1/1993 |
| DE | 4142101 A1 | 6/1993 |
| DE | 10235046 A1 | 2/2004 |
| DE | 60023688 T2 | 7/2006 |
| DE | 102014108748 A1 | 12/2015 |
| EP | 0524550 A1 | 1/1993 |
| EP | 1271121 A2 | 1/2003 |
| EP | 1 555 517 A2 | 7/2005 |
| EP | 1555517 A2 | 7/2005 |
| EP | 1860417 A2 | 11/2007 |
| EP | 2463635 A1 | 6/2012 |
| GB | 2204412 A | 11/1988 |
| WO | 2004013593 A1 | 2/2004 |

OTHER PUBLICATIONS

International Search Report, EPO, The Netherlands, dated Sep. 21, 2015.

English Translation of the International Preliminary Report on Patentability, WIPO, Geneva, CH, dated Jan. 5, 2017.

First Office Action in corresponding Application No. 201580034035.X, dated Aug. 9, 2018.

* cited by examiner

Fig. 3

Fig. 4

CAPACITIVE PRESSURE DIFFERENCE SENSOR AND METHOD FOR ITS MANUFACTURE

TECHNICAL FIELD

The present invention relates to a capacitive pressure difference sensor and a method for its manufacture.

BACKGROUND DISCUSSION

Pressure difference sensors are applied in industrial measurements technology for measuring pressure differences resulting from a pressure difference between a first and a second pressure acting on the pressure difference sensor.

Applied as pressure difference sensors are pressure difference sensors referred to e.g. as semiconductor sensors or sensor chips, which can be produced cost effectively on an undivided wafer by applying processes known from semiconductor technology.

These pressure difference sensors usually have a measuring membrane arranged between two platforms. Pressure chambers are enclosed In each of the two platforms, under the measuring membrane. In measurement operation, the first side of the measuring membrane is supplied with the first pressure via an opening in the first platform and the second side of the measuring membrane is supplied with the second pressure via an opening in the second platform.

In the case of capacitive pressure difference sensors, the deflection of the measuring membrane resulting from the difference between the two pressures is registered by means of a capacitive, electromechanical transducer and converted into an electrical signal reflecting the pressure difference to be measured. Semiconductor sensors have, regularly, measuring membranes of silicon, which, due to its conductivity, can be directly applied as an electrode of the capacitive transducer. Additionally, capacitive transducers comprise at least one rigid counterelectrode integrated into one of the two platforms and electrically insulated relative to the measuring membrane for forming together with the measuring membrane serving as electrode a capacitor. The capacitances of these capacitors depend on the deflection of the measuring membrane, which, in turn, depends on the pressure difference to be measured.

Fundamentally, it would be possible to equip pressure difference sensors with one-piece platforms forming the counterelectrodes, between which platforms there is arranged a silicon disk serving as measuring membrane and at the same time as electrode. For this, insulating layers are provided between the silicon disk and each of the two counterelectrodes. Via these insulating layers, an outer edge of the silicon disk is connected with the outer edges of the respective counterelectrodes for enclosing the respective pressure chambers.

Use of such pressure difference sensors is discouraged in German patent, DE 38 27 138 A1, since in the case of these pressure difference sensors, there is the problem, described in detail in German patent, DE 38 27 138 A1, that each of the two capacitors formed by the silicon disk and one of the two one-piece platforms is composed of an inner capacitor portion and an outer capacitor portion externally surrounding the inner capacitor portion. The inner capacitor portion is located in the region of the pressure difference sensor, in which the central region of the silicon disk experiences the deflection dependent on the pressure difference. The outer capacitor portion is located in the region of the pressure difference sensor, in which the outer edge of the silicon disk surrounding the central region is arranged between the insulating layers.

The capacitance C1, C2 of each of the two capacitors corresponds to the sum of the capacitances C1$a$, C1$b$, respectively C2$a$, C2$b$, of the two capacitor portions, of which they are composed. In such case, however, only the capacitance C1$a$, respectively C2$a$, of the inner capacitor portion has the pressure difference dependence metrologically to be registered. The has the result that the capacitance change $\Delta$C1$a$, respectively $\Delta$C2$a$ metrologically to be registered dependent on the pressure difference dependent deflection of the inner region of the silicon disk is small in comparison to the measured capacitance C1=C1$a$+C1$b$, respectively C2=C2$a$+C2$b$, given by the sum of the capacitances. Correspondingly, the accuracy of measurement achievable thereby is very small.

Also, the differential change f of the two capacitances C1, C2 described in German patent, DE 38 27 138 A1 and utilized in pressure measuring technology for ascertaining the pressure difference, as determined based on the ratio of the difference C1−C2 of the two capacitances to their sum C1+C2, i.e. f=(C1−C2)/C1+C2), does not have the desired linear dependence on the pressure difference to be measured.

These disadvantages are especially significant in the case of pressure difference sensors with square footprint, since the electrode areas operative for the capacitances C1$b$, C2$b$ of the outer capacitor portions are especially large in the case of silicon disk and counterelectrodes with corresponding square footprints.

Semiconductor sensors manufacturable in the undivided wafer have, however, regularly, square footprint surfaces, since square footprint surfaces enable the pressure difference sensors manufactured in the undivided wafer to be separated into single chips by sawing along straight lines.

This problem is solved in the state of the art in the manner described e.g. in German patent, DE 38 27 138 A1 and in DE 103 93 943 B3 by applying special platforms on both sides of the silicon disk forming the measuring membrane. These platforms are constructed of three layers arranged on top of one another and have, in each case, a conductive layer facing the silicon disk and a conductive layer facing away from the silicon disk. The conductive layers are separated from one another by an insulating layer arranged between the two conductive layers. In the conductive layer facing the silicon disk, there is provided, in each case, at least one annular moat leading to the insulating layer. The annular moat divides the layer into a region surrounded by the moat and serving as counterelectrode, and an outer region externally surrounding the moat and supporting the silicon disk. In such case, the inner region is structured in such a manner that it is spaced from the silicon disk.

The manufacture of such pressure difference sensors is, however, comparatively complicated, since each platform must be constructed of a number of layers, and the individual layers must be correspondingly structured and bonded with one another. Moreover, the counterelectrodes enclosed in the platforms must be electrically contacted through the outer layer and the insulating layer of the respective platforms.

SUMMARY OF THE INVENTION

It is an object of the present invention to provide a simply constructed and cost effectively manufacturable pressure difference sensor, as well as a method for its manufacture.

To this end, the invention resides in a pressure difference sensor, comprising
- a first counterelectrode and a second counterelectrode,
- a conductive disk arranged between the two counterelectrodes,
- a first insulating layer, via which an outer edge of the disk is connected with an outer edge of the first counterelectrode to form a first pressure chamber,
- a second insulating layer, via which an outer edge of the disk is connected with an outer edge of the second counterelectrode to form a second pressure chamber,
- an opening provided in the first counterelectrode, via which opening the first pressure chamber is contactable with a first pressure, and
- an opening provided in the second counterelectrode, via which opening the second pressure chamber is contactable with a second pressure, characterized in that
- the disk is divided by a moat into an inner region serving as an electrode and an outer region electrically insulated therefrom by the moat,
- the inner region includes a measuring membrane arranged between the two pressure chambers and an edge region surrounding the measuring membrane and clamped between the inner edges of the two insulating layers, and
- the inner region forms with each of the counterelectrodes, in each case, a capacitor having a capacitance dependent on a pressure difference between the first and second pressures acting on the measuring membrane.

In a first further development, the inner region includes a connection region, especially a spit shaped connection region, extending to the edge of the disk.

A further development of the first further development is characterized in that
- the insulating layer arranged between the disk and the second counterelectrode has a recess exposing at least a portion of the connection region,
- the second counterelectrode has a recess communicating with the recess of the insulating layer, and
- an electrical connection of the inner region serving as electrode occurs through the recess in the counterelectrode and the recess in the second insulating layer.

In an embodiment of the latter further development, the connection of the inner region occurs via a conductive trace, especially a conductive trace applied by sputter deposition of a metallization, wherein the conductive trace extends from the connection region along a lateral surface of the second insulating layer and a lateral surface of the second counterelectrode to a rear side of the second counterelectrode facing away from the disk, wherein between the conductive trace and the surfaces of the second counterelectrode, on which the conductive trace extends, an insulation layer is provided.

In a preferred embodiment, the moat has a moat width greater than or equal to 5 µm. Preferably, the moat has a moat width, which is greater than or equal to a fourth of a thickness of the disk.

In an additional preferred embodiment, the edge region of the inner region clamped between the inner edges of the two insulating layers has a width, which is greater than or equal to 500 µm.

In an additional embodiment, connections are applied to the first and second counterelectrodes, especially as sputter deposited metallizations, via which the counterelectrodes are electrically connectable.

A preferred embodiment of the pressure difference sensor of the invention is characterized in that
- the first and second counterelectrodes are single pieces, especially pieces of silicon,
- the disk is a silicon disk, especially a silicon disk manufactured of a top layer of an SOI wafer, and
- the first and second insulating layers are silicon oxide layers.

Additionally, the invention includes a method for operating a pressure difference sensor of the invention, characterized in that
- based on a capacitance of the first capacitor formed by the disk inner region serving as electrode and the first counterelectrode and/or a capacitance of the second capacitor formed by the disk inner region serving as electrode and the second counterelectrode, the pressure difference acting on the measuring membrane is determined, and/or
- based on a capacitance of a capacitor formed by the first and second counterelectrodes, a measure for a system pressure acting equally on the two sides of the pressure difference sensor is determined.

Additionally, the invention includes a method for manufacture of a pressure difference sensor of the invention, especially a method executable in an undivided wafer for parallel manufacture of a plurality of equally constructed pressure difference sensors, characterized in that
- the moat is introduced into a top, disk forming layer of an SOI wafer, especially etched in by deep reactive ion etching,
- the first insulating layer is manufactured from an insulation layer applied on a support layer of a first silicon wafer, wherein a region of the insulation layer surrounded externally by a remaining edge of the insulation layer forming the first insulating layer is removed, especially etched away by an etching method executed with buffered hydrofluoric acid,
- the first counterelectrode is manufactured from the support layer of the first silicon wafer by introducing into the support layer a hollow forming the opening of the first counterelectrode, especially a hollow etched in by means of deep reactive ion etching or by means of an etching method executed with potassium hydroxide,
- the insulation layer of the first silicon wafer is connected in such a manner with the top layer of the SOI wafer, especially connected by means of silicon fusion bonding, that the opening of the first counterelectrode is located over the measuring membrane,
- the top layer of the SOI wafer is exposed by removing the support layer of the SOI wafer, especially etched away by means of deep reactive ion etching or by means of an etching method executed with potassium hydroxide, and by removing an insulation layer of the SOI wafer exposed thereby, especially etched away by an etching method executed with buffered hydrofluoric acid, by a reactive ion etching method or by a deep reactive ion etching method,
- the second insulating layer is manufactured from an insulation layer applied on a support layer of a second silicon wafer, wherein a region of the insulation layer externally surrounded by a remaining edge of the insulation layer forming the second insulating layer is removed, especially etched away by an etching method executed with buffered hydrofluoric acid,
- the second counterelectrode is manufactured from the support layer of the second silicon wafer by introducing into the support layer a hollow forming the opening of the second counterelectrode, especially a hollow etched in by means of deep reactive ion etching or an etching method executed with potassium hydroxide, and the second silicon wafer is connected in such a manner with the top layer of the SOI wafer connected with the first silicon wafer, especially connected by silicon fusion bonding, that the openings of the two counterelectrodes lie opposite one another on both sides of the measuring membrane.

An embodiment of this method is characterized in that the inner region includes the connection region extending to the edge of the disk, in the manufacturing of the second insulating layer a recess exposing at least a portion of the connection region is produced in the insulating layer, and in the manufacturing of the second counterelectrode a recess in the second counterelectrode communicating with the recess in the insulating layer is produced.

An additional development of the method of the invention is characterized in that a plurality of equally constructed pressure difference sensors are manufactured in parallel on an undivided wafer, wherein the pressure difference sensors are manufactured pairwise next to one another in such a manner that the connection regions of the two pressure difference sensors of each pair adjoin one another, the pressure difference sensors are constructed mirror symmetrically to a dividing line extending between the connection regions of the pairs, along which line the undivided wafer is separated in the case of final separating of the pressure difference sensors, the mutually adjoining recesses in the second insulating layers of each pair are produced by removing a single continuous region of the insulation layer of the second silicon wafer, and the mutually adjoining recesses in the second counterelectrodes of each pair are produced by introducing a single hollow into the support layer of the second silicon wafer.

The pressure difference sensor of the invention has the advantage that the inner region serving as electrode of the conductive disk is separated by the moat from the outer region of the disk. In this way, the fraction of the capacitance portion changing as a function of the pressure difference to the measured total capacitance of the two capacitors formed by the electrode and, in each case, one of the counterelectrodes is significantly enlarged. This means that the pressure difference sensor has a significantly higher accuracy of measurement than pressure difference sensors, in the case of which the entire layer is applied as electrode.

Moreover, the pressure difference sensor of the invention is very simply constructed and cost effectively manufacturable due to the use of one-piece platforms serving directly as counterelectrodes.

Since the size of the footprint of the outer region has due to the moat no influence on the accuracy of measurement, the geometry of the footprint of the pressure difference sensor is almost freely selectably, and can, thus, be square for enjoying the advantages connected therewith in the case of manufacture on an undivided wafer.

BRIEF DESCRIPTION OF THE DRAWINGS

The invention and its advantages will now be explained in greater detail based on the figures of the drawing, in which an example of an embodiment is shown. Equal elements are provided in the figures with equal reference characters. The figures of the drawing show as follows.

DETAILED DISCUSSION IN CONJUNCTION WITH THE DRAWINGS

Figure 1:
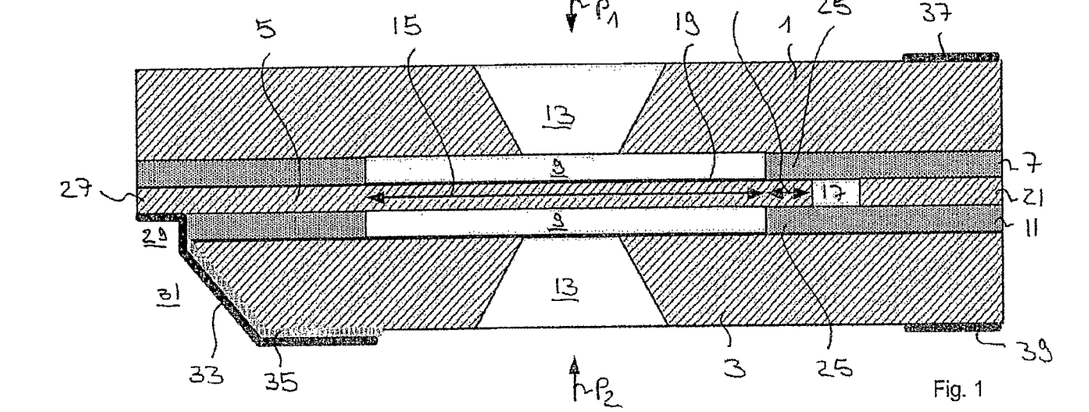
FIG. 1 is a pressure difference sensor of the invention.
Figure 2:
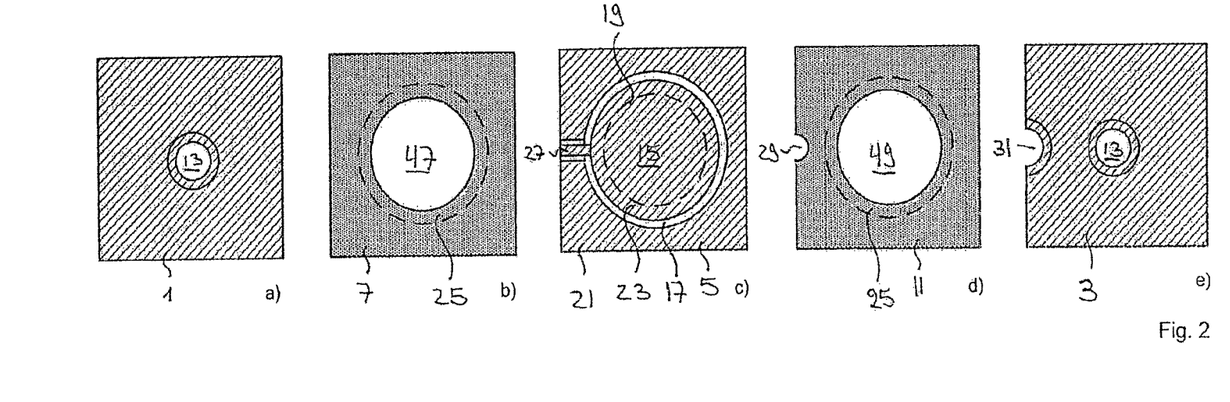
FIG. 2 shows top views of the individual layers of the pressure difference sensor of FIG. 1.

FIG. 1 shows an example of an embodiment of a pressure difference sensor of the invention. FIG. 2 shows top views of the individual layers, of which the pressure difference sensor of FIG. 1 is constructed. The pressure difference sensor includes a disk 5 arranged between first and second counterelectrodes 1, 3. Disk 5 and the counterelectrodes 1, 3 are made of an electrically conductive material, preferably crystalline silicon. The counterelectrodes 1, 3 are essentially washer shaped, and have a significantly greater thickness than the disk 5. The thickness of disk 5 is predetermined as a function of the measuring range of the pressure difference sensor, and lies typically in the order of magnitude of some 10 s of µm, e.g. in a range from 20 µm to 100 µm. In the comparison thereto, the counterelectrodes 1, 3 have a thickness in the order of magnitude of some hundreds of micrometers, e.g. 300 µm.

Provided between disk 5 and the first counterelectrode 1 is a first insulating layer 7, preferably a silicon oxide layer, via which an outer edge of a first side of the disk 5 facing the first counterelectrode 1 is connected pressure-tightly with an outer edge of the face of the first counterelectrode 1 facing the disk 5 to form a first pressure chamber 9 enclosed between the first counterelectrode 1 and the disk 5.

Provided between the disk 5 and the second counterelectrode 3 is a second insulating layer 11, preferably a silicon oxide layer, via which an outer edge of a second side of the disk 5 facing the second counterelectrode 3 is connected pressure-tightly with an outer edge of the face of the second counterelectrode 3 facing the disk 5 to form a second pressure chamber 9 enclosed between the second counterelectrode 3 and the disk 5.

Provided in the first counterelectrode 1 is an opening 13 extending through the first counterelectrode 1 and communicating with the first pressure chamber 9. Via the opening 13, the first pressure chamber 9 is contactable with a first pressure $p_1$. Provided in the second counterelectrode 3 is an opening 13, preferably an equally formed opening, extending through the second counterelectrode 3 and communicating with the second pressure chamber 9. Via the opening 13, the second pressure chamber 9 is contactable with a second pressure $p_2$.

The preferably circular region of the disk 5 located between the two pressure chambers 9 forms a measuring membrane 15, on whose first side facing the first counterelectrode 1 the first pressure $p_1$ acts, and on whose second side facing the second counterelectrode 3 the second pressure $p_2$ acts. The region forming the measuring membrane 15 is indicated in c) of FIG. 2 by a dashed circle. Measuring membrane 15 has, for example, a diameter of 2 mm to 3 mm. Correspondingly, the insulating layers 7, 11 have in their centers, in each case, a circular opening exposing the measuring membrane 15 and forming the respective pressure chamber 9. The pressure difference $\Delta p$ acting on the measuring membrane 15 and given by the difference between the first and second pressures $p_1$, $p_2$ effects a deflection of the measuring membrane 15 dependent on the pressure difference $\Delta p$ to be measured.

According to the invention, disk 5 is divided by a moat 17 into an inner region 19 and an outer region 21 surrounding the inner region 19. The inner and outer regions 19, 21 are electrically insulated from one another by the moat 17. In such case, a moat width in the order of magnitude of 5 µm to 10 µm is already sufficient to assure a sufficient electrical insulation of the two regions 19, 21 from one another. Preferably, the moat width is greater than or equal to a fourth of the thickness of the disk 5.

Inner region 19 includes the exposed measuring membrane 15 and a narrow edge region 23 adjoining the measuring membrane 15 and surrounding the measuring membrane 15 externally on all sides. The openings in the two insulating layers 7, 11 forming the pressure chambers 9 are dimensioned in such a manner that the inner edges 25 of the insulating layers 7, 11 adjoining the openings cover the moat 17 and the edge region 23 of the inner region 19 of the disk 5. Edge region 23 is clamped between the inner edges 25 of the two insulating layers 7, 11. In such case, it is sufficient, when the edge region 23 clamped between the inner edges 25 in the axial direction—thus parallel to the surface normal to the measuring membrane 15—has in the radial direction a width—indicated in FIG. 1 by a double arrow—of greater than or equal to 500 µm, in order to bring about a sufficiently stable, external clamping.

Inner region 19 serves as electrode, which forms with each of the two counterelectrodes 1, 3, in each case, a capacitor, whose capacitance C1, respectively C3, changes as a function of the deflection of the measuring membrane 15 dependent on the pressure difference $\Delta p$.

Preferably, inner region 19 includes a connection region 27, which extends from the measuring membrane 15 out to an outer edge of the disk 5. Connection region 27 is preferably embodied as a narrow spit, to whose two long sides the moat 17 extends. The upper side of the connection region 27 facing the first counterelectrode 1 is covered by the first insulating layer 7. The second insulating layer 11 arranged on the lower side of the connection region 27 between the disk 5 and the second counterelectrode 3 includes externally a recess 29, by which at least a portion of the connection region 27 is exposed. Correspondingly, also the second counterelectrode 3 includes an external recess 31, which communicates with the recess 29 in the second insulating layer 11 exposing the connection region 27. The inner region of the disk 5 serving as electrode 19 can, thus, be contacted through the recesses 29, 31 in the second insulating layer 11 and the second counterelectrode 3 via the lower side of the connection region 27.

The electrical connection of the electrode occurs preferably via a conductive trace 33, e.g. in the form a metallization, applied on the exposed lower side of the connection region 27. The conductive trace 33 leads preferably from the lower side of the connection region 27 via a lateral surface of the recess 29 in the second insulating layer 11 and a lateral surface of the recess 31 in the second counterelectrode 3 to the rear side of the counterelectrode 3 facing away from the disk 5. For electrical insulation of the conductive trace 33 from the second counterelectrode 3, an insulation layer 35 is provided between the conductive trace 33 and the surfaces of the second counterelectrode 3, over which the conductive trace 33 extends.

The electrical connection of the two counterelectrodes 1, 3 occurs preferably via connections 37, 39 applied directly on counterelectrode 1, respectively 3.

The electrode and the two counterelectrodes 1, 3 are connected to a measurement circuit (not shown), which determines based on the capacitance C1 of the first capacitor formed by the electrode and the first counterelectrode 1 and/or the capacitance C3 of the second capacitor formed by the electrode and the second counterelectrode 3 the pressure difference $\Delta p$ acting on the measuring membrane 15. For this, the capacitance C1, C3 of the first and/or the second capacitor can be directly associated with a pressure difference measured value based on a characteristic curve of the pressure difference sensor ascertained in a calibration procedure. Alternatively, based on the first and second capacitances, the change f of the two capacitances C1, C3 can be determined according to $f=(C1-C2)/C1+C2)$, which is then associated with a difference pressure measured value based on a characteristic curve of the pressure difference sensor ascertained in a calibration procedure.

Additionally, a capacitance $C_S$ of a capacitor formed by the two counterelectrodes 1, 3 can be determined by means of the measurement circuit. This capacitance $C_S$ depends on the separation of the two counterelectrodes 1, 3 from one another, and can, thus, be taken into consideration as a measure for a system pressure $p_S$ acting equally on the two sides of the pressure difference sensor. The system pressure $p_S$ acting equally on the two sides of the pressure difference sensor effects a compression of the pressure difference sensor in the axial direction—i.e. parallel to the surface normal of the measuring membrane 15—as a result of which the separation of the two counterelectrodes 1, 3 from one another changes.

The system pressure $p_S$ measured in this way can be taken into consideration e.g. for compensating a measurement error of the pressure difference measurement dependent on the system pressure $p_S$.

The first and second capacitors are composed, in each case, of an inner capacitor portion, whose capacitor surfaces correspond to the area of the measuring membrane 15, and an outer capacitor portion externally surrounding the inner capacitor portion. In contrast to an analogously constructed pressure difference sensor without moat in the disk 5, the capacitor surfaces of the outer capacitor portions are outwardly limited by the moat 17. The capacitor surfaces of the outer capacitor portions comprise exclusively the capacitor surfaces given by the area of the outer edge region 23 of the inner region 19 of the disk 5 and the area of the spit shaped connection region 27. The invention offers the advantage that the area of the moat 17 and the area of the total outer region 21 of the disk 5 do not, due to the moat 17, contribute to the capacitor surface of the outer capacitor portions.

Since the capacitance of a capacitor rises in proportion to its capacitor surface, the metrologically to be registered capacitance change $\Delta C1a$, respectively $\Delta C3a$, dependent on the pressure difference dependent deflection of the measuring membrane 15 in comparison to the measured capacitances $C1=C1a+C1b$, respectively $C3=C3a+C3b$ given by the sum of the capacitances is in the case of the pressure difference sensor of the invention significantly larger than would be the case for a pressure difference sensor without moat 17.

With the invention, it is thus possible to achieve a sufficient accuracy of measurement with pressure difference sensors having only platforms composed of a single layer serving as counterelectrode.

Since the outer region 21 of the disk 5 does not contribute to the capacitance of the outer capacitor portions, the geometry of the footprint of the pressure difference sensor of the invention is freely selectable. Correspondingly, the pressure difference sensor can have a square footprint advantageous as regards its cost effective manufacture on an undivided wafer, without that disadvantages thereby arise in reference to the achievable accuracy of measurement.

Figure 3:
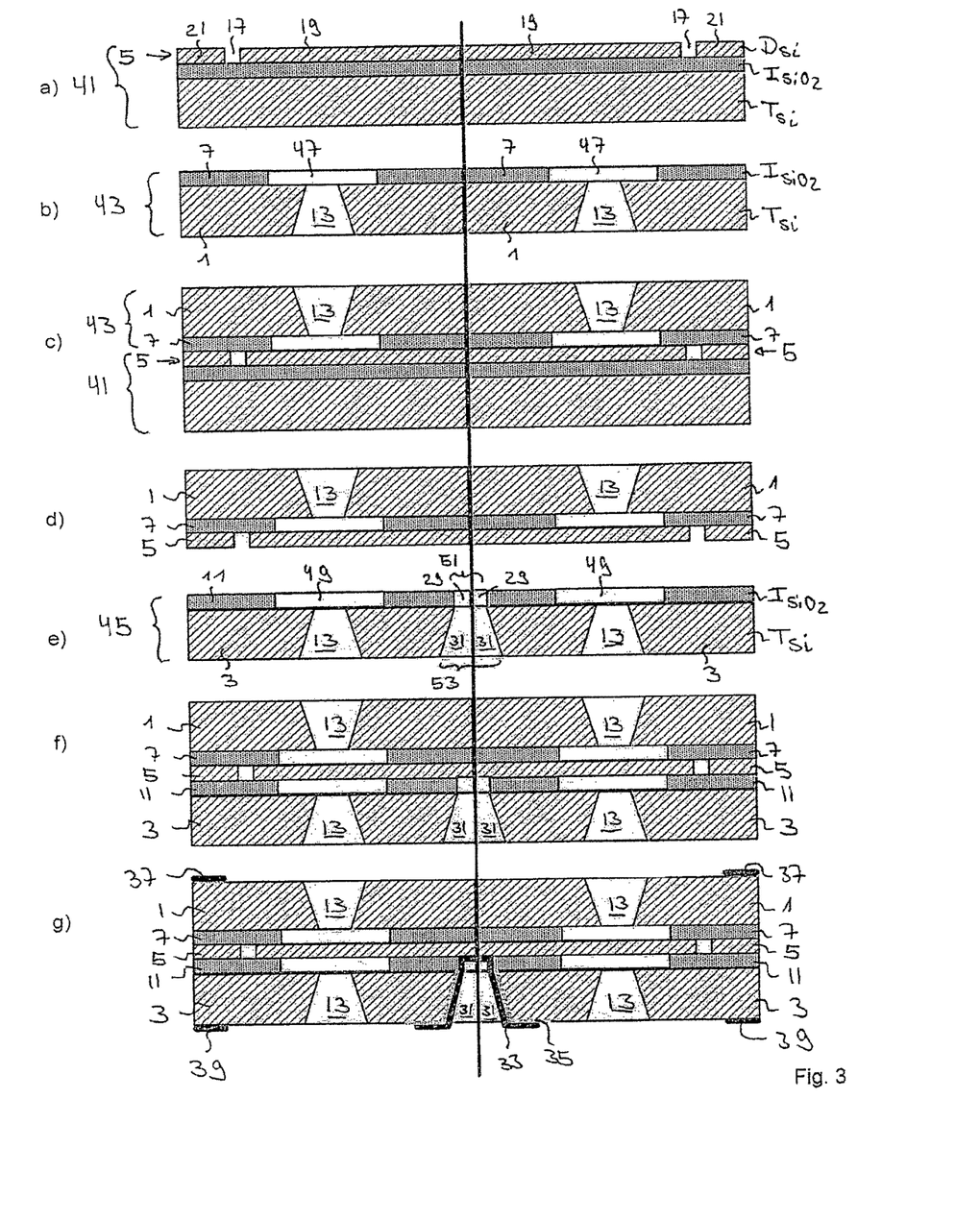
FIG. 3 shows method steps a)-g) for manufacture of the pressure difference sensor of FIG. 1.

The manufacture of the pressure difference sensor of the invention occurs preferably based on the method now to be described based on FIG. 3. While for manufacture of pressure difference sensors with counterelectrodes integrated in multilayered platforms regularly at least three expensive SOI wafers are required, for manufacture of the pressure difference sensor of the invention only a single SOI wafer 41 is required, together with first and second silicon wafers 43, 45. The SOI wafer 41 includes a support layer $T_{Si}$ of silicon, an insulation layer $I_{SiO2}$ on the support layer $T_{Si}$, especially a silicon oxide layer, and a top layer $D_{Si}$ of silicon arranged on the insulation layer $I_{SiO2}$. The first and second silicon wafers 43, 45 comprise, in each case, a support layer $T_{Si}$ of silicon, and an insulation layer $I_{SiO2}$, especially a silicon oxide layer, applied on the support layer $T_{Si}$. The applying of the respective insulation layers $I_{SiO2}$ occurs e.g. in an oxidation process, e.g. a wet- or moist oxide process.

The method is preferably executed for a large number of pressure difference sensors on an undivided wafer. FIG. 3 shows the method using, by way of example, two pressure difference sensors manufactured on an undivided wafer. For parallel manufacturing of greater, preferably even numbers of pressure difference sensors, this example can be correspondingly expanded. In such case, the pressure difference sensors are preferably manufactured pairwise in such a manner next to one another that the connection regions 27 of the two pressure difference sensors of each pair adjoin one another, and the two pressure difference sensors are constructed mirror symmetrically to a dividing line extending between the two connection regions 27, along which dividing line the previously undivided wafer is divided upon the final separating of the pressure difference sensors. The dividing line is drawn in FIG. 3 as a solid line extending through all method steps a)-g).

Figure 4:
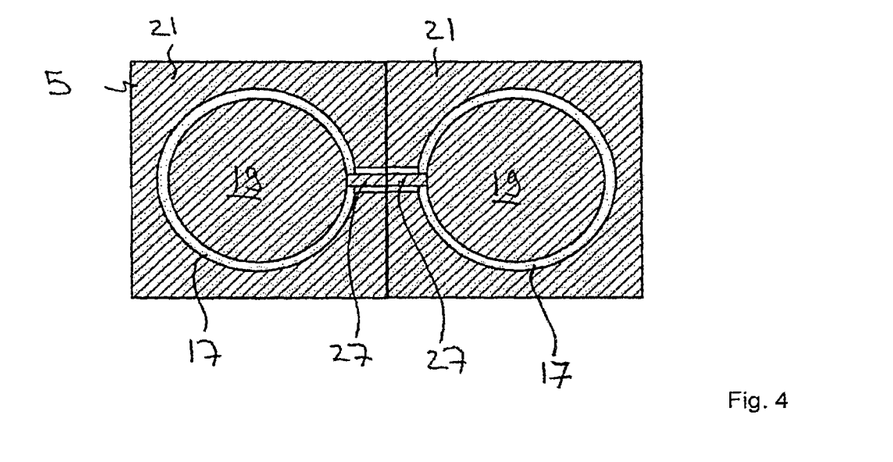
FIG. 4 is a plan view of the top layer of the SOI wafer shown in method step a) of FIG. 3.

The top layer $D_{Si}$ of the SOI wafer 41 forms the disks 5 of the pressure difference sensors. Correspondingly, in method step a), the moats 17 are introduced into the top layer $D_{Si}$ of the SOI wafer 41. The moats divide the individual disks 5, in each case, into the inner region 19 and the outer region 21. Due to the pairwise manufacturing, the moats 17 of the two pressure difference sensors of each pair form in plan view a closed, bar-bell shaped, geometric figure extending symmetrically to the dividing line. FIG. 4 shows, for this, a plan view onto the top layer $D_{Si}$ of the SOI wafer 41 prepared according to method step a). Preferably applied for manufacture of the moats 17 is an etching method, such as that known e.g. under the name 'deep reactive ion etching (DRIE)'.

In parallel or subsequently thereto, manufactured in method step b) from the insulation layer $I_{SiO2}$ of the first silicon wafer 43 are the first insulating layers 7, and from the support layer $T_{Si}$ of the first silicon wafer the first counterelectrodes 1. For this, a working of the insulation layer $I_{SiO2}$ of the first silicon wafer 43 is performed, in which working there are removed, here, circular, disk shaped regions 47 of the insulation layer $I_{SiO2}$, in each case, externally surrounded by a remaining edge of the insulation layer $I_{SiO2}$ forming the first insulating layer 7. For illustration, the reference characters 47 of the region to be removed are shown in FIG. 2 b). Applied for the removing is preferably an etching method executed with buffered hydrofluoric acid (BHF). Additionally, hollows forming the openings 13 of the first counterelectrodes 1 are introduced, preferably etched, into the support layer $T_{Si}$ of the first silicon wafer 43. Suited for this is the deep reactive ion etching (DRIE) method. Alternatively, the etching can be performed by means of potassium hydroxide (KOH).

In the following method step c), the SOI wafer 41 processed according to method step a) is pressure-tightly connected with the first silicon wafer 43 worked according to method step b). For this, the first silicon wafer 43 is placed in such a manner on the SOI wafer 41 that the insulation layer $I_{SiO2}$ of the first silicon wafer 43 lies on the top layer $D_{Si}$ of the SOI wafer 41, and the openings 13 are located centrally over the portions of the inner regions 19 forming the measuring membrane 15. The pressure tight connection between the insulation layer $I_{SiO2}$ of the first silicon wafer 43 and the top layer $D_{Si}$ of the SOI wafer 41 is preferably effected by means of silicon fusion bonding.

Then, in method step d) the support layer $T_{Si}$ of the SOI wafer 41 and the insulation layer $I_{SiO2}$ of the SOI wafer 41 exposed by the removal of the support layer $T_{Si}$ are removed. The removal of the support layer $T_{Si}$ can occur purely mechanically by grinding. Preferably, an etching method, such as e.g. deep reactive ion etching (DRIE) or an etching executed by means of potassium hydroxide (KOH), is applied for removing the support layer $T_{Si}$. Preferably applied for removing the insulation layer $I_{SiO2}$ is an etching method executed with buffered hydrofluoric acid (BHF). Alternatively applied for this can be the reactive ion etching method, or the deep reactive ion etching method.

In parallel or subsequently thereto, manufactured in method step e) from the insulation layer $I_{SiO2}$ of the second silicon wafer 45 are the second insulating layers 11, and from the support layer $T_{Si}$ of the second silicon wafer the second counterelectrodes 3.

For this, a working of the insulation layer $I_{SiO2}$ of the second silicon wafer 45 is performed, in which working there are removed, here, circular, disk shaped regions 49 of the insulation layer $I_{SiO2}$, in each case, externally surrounded by a remaining edge of the insulation layer $I_{SiO2}$ forming the second insulating layer 11. For illustration, the reference characters 49 of the region to be removed are shown in FIG. 2 d). The regions 49 are equal in form to the regions 47 removed in method step b) from the insulation layer $I_{SiO2}$ of the first silicon wafer 43. Produced in the same working step are the recesses 29 of the second insulating layers 11 at least partially exposing the connection regions 27 in the pressure difference sensor. Since the connection regions 27 of two pressure difference sensors of a pair adjoin one another, also the associated two recesses 29 border one another. This offers the advantage that, in each case, two mutually bordering recesses 29 can be manufactured by removing a single combined region 51.

Preferably applied for removing the regions 49, 51 is an etching method executed with buffered hydrofluoric acid (BHF).

Then, hollows forming the openings 13 of the second counterelectrodes 3 are introduced, preferably etched, into the support layer $T_{Si}$ of the second silicon wafer 45. Manufactured in the same working step are the recesses 31 of the second counterelectrodes 3. Since the connection regions 27 of two pressure difference sensors of a pair adjoin one another, also the associated recesses 31 in the associated counterelectrodes 3 making the connection regions 27 accesible border one another. This offers the advantage that, in each case, two mutually bordering recesses 31 can be manufactured by the introduction of a single hollow 53. Suited for introducing the hollows forming the openings 13, as well as the hollows 53 forming, in each case, the two recesses 31, is the method of deep reactive ion etching. Alternatively, the etching can be performed by means of potassium hydroxide (KOH).

In method step f), the second silicon wafer 45 processed in this way is pressure-tightly connected in such a manner with the top layer $D_{Si}$ of the SOI wafer 41 of the composite prepared in method step d) that the hollows of the two silicon wafer 43, 45 forming the openings 13 are located oppositely lying on the two sides of the disk 5, and the hollows 53 forming, in each case, the two recesses 31 are located under the associated connection regions 27. Also this pressure tight connection is preferably effected by means of silicon fusion bonding.

Finally in method step g), the conductive traces 33 and the connections 37, 39 are applied, and the pressure difference sensors manufactured on an undivided wafer are separated by sawing.

For method step g), there is applied on the regions of the lateral surfaces bounding the recesses 31 and the regions of the rear sides of the second counterelectrodes 3, over which the conductive traces 33 will extend, in each case, the insulating layer 35. On the exposed connection regions 27 and the, in each case, thereon bordering inner lateral surface of the recess 29 of the second insulating layer 11, the conductive traces 33 are applied directly without interpositioning of an insulating layer.

In the same way, also the connections 37, 39 of the first and second counterelectrodes 1, 3 are applied directly on the corresponding locations on the rear sides of the first and second counterelectrodes 1, 3.

The conductive traces 33 and the connections 37, 39 for this method step are preferably embodied as metallizations, which are applied e.g. by sputtering. They are e.g. of aluminum. Alternatively, with the interpositioning of adherence means, also metallizations of gold, titanium or platinum can be applied.

The invention claimed is:

1. A pressure difference sensor, comprising:
    first and second counterelectrodes;
    a conductive disk arranged between said first and second counterelectrodes;
    a first insulating layer, via which an outer edge of said conductive disk is connected with an outer edge of said first counterelectrode to form a first pressure chamber;
    a second insulating layer, via which an outer edge of said conductive disk is connected with an outer edge of said second counterelectrode to form a second pressure chamber;
    an opening provided in said first counterelectrode, via which opening said first pressure chamber is contactable with a first pressure; and
    an opening provided in said second counterelectrode, via which opening said second pressure chamber is contactable with a second pressure, wherein:
    said conductive disk is divided by a moat into an inner region serving as an electrode and an outer region electrically insulated therefrom by said moat;
    said inner region includes a measuring membrane arranged between said two pressure chambers and an edge region surrounding said measuring membrane and clamped between the inner edges of said two insulating layers; and
    said inner region forms with each of said counterelectrodes, in each case, a capacitor having a capacitance dependent on a pressure difference between said first and said second pressures acting on said measuring membrane;
    wherein the capacitors are composed, in each case, of an inner capacitor portion, whose capacitor surfaces correspond to the area of the measuring membrane, and an outer capacitor portion externally surrounding the inner capacitor portion and wherein the area of the moat and the area of the total outer region of the disk do not, due to the moat, contribute to the capacitor surface of the outer capacitor portions.

2. The pressure difference sensor as claimed in claim 1, wherein:
    said inner region includes a connection region, especially a spit shaped connection region, extending to the edge of said disk.

3. The pressure difference sensor as claimed in claim 2, wherein:
    said insulating layer arranged between said disk and said second counterelectrode has a recess exposing at least a portion of said connection region;
    said second counterelectrode has a recess communicating with said recess of said insulating layer; and
    an electrical connection of the inner region serving as electrode occurs through said recess in said counterelectrode and said recess in said second insulating layer.

4. The pressure difference sensor as claimed in claim 3, wherein:
    the connection of said inner region occurs via a conductive trace, especially a conductive trace applied by sputter deposition of a metallization;
    said conductive trace extends from said connection region along a lateral surface of said second insulating layer and a lateral surface of said second counterelectrode to a rear side of said second counterelectrode facing away from said disk; and
    between said conductive trace and the surfaces of said second counterelectrode, on which said conductive trace extends, an insulation layer is provided.

5. The pressure difference sensor as claimed in claim 1, wherein:
    said moat has a moat width greater than or equal to 5 µm.

6. The pressure difference sensor as claimed in claim 5, wherein:
    said moat has a moat width, which is greater than or equal to a fourth of a thickness of said disk.

7. The pressure difference sensor as claimed in claim 1, wherein:
    said edge region of said inner region clamped between said inner edges of said two insulating layers has a width, which is greater than or equal to 500 µm.

8. The pressure difference sensor as claimed in claim 1, wherein:
    connections are applied to said first and said second counterelectrodes, especially as sputter deposited metallizations, via which said counterelectrodes are electrically connectable.

9. The pressure difference sensor as claimed in claim 1, wherein:
    said first and said second counterelectrodes are single pieces, especially pieces of silicon;
    said disk is a silicon disk, especially a silicon disk manufactured of a top layer (DSi) of an SOI wafer; and
    said first and said second insulating layers are silicon oxide layers.

10. A method for operating a pressure difference sensor comprising first and second counterelectrodes; a conductive disk arranged between said first and second counterelectrodes; a first insulating layer, via which an outer edge of said conductive disk is connected with an outer edge of said first counterelectrode to form a first pressure chamber; a second insulating layer, via which an outer edge of said conductive disk is connected with an outer edge of said second counterelectrode to form a second pressure chamber; an opening provided in said first counterelectrode, via which opening said first pressure chamber is contactable with a first pressure; and an opening provided in said second counterelectrode, via which opening said second pressure chamber is contactable with a second pressure, wherein: said conductive disk is divided by a moat into an inner region serving as an electrode and an outer region electrically insulated therefrom by said moat; said inner region includes a measuring membrane arranged between said two pressure chambers and an edge region surrounding said measuring membrane and clamped between the inner edges of said two insulating layers; and said inner region forms with each of said counterelectrodes, in each case, a capacitor having a capacitance dependent on a pressure difference between said first and said second pressures acting on said measuring membrane, the method comprising the steps of:
  determining the pressure difference acting on the measuring membrane, based on a capacitance of a first capacitor formed by the disk inner region serving as electrode and the first counterelectrode and/or a capacitance of a second capacitor formed by the disk inner region serving as electrode and the second counterelectrode and/or
  determining a measure for a system pressure acting equally on the two sides of the pressure difference sensor based on a capacitance of a capacitor formed by the first and second counterelectrodes;
  wherein the capacitors are composed, in each case, of an inner capacitor portion, whose capacitor surfaces correspond to the area of the measuring membrane, and an outer capacitor portion externally surrounding the inner capacitor portion and wherein the area of the moat and the area of the total outer region of the disk do not, due to the moat, contribute to the capacitor surface of the outer capacitor portions.

11. The method for manufacture of a pressure difference sensor as claimed in claim 10, especially a method executable in an undivided wafer for parallel manufacture of a plurality of equally constructed pressure difference sensors, wherein:
  the moat is introduced into a top, disk forming layer (DSi) of an SOI wafer, especially etched in by deep reactive ion etching (DRIE);
  the first insulating layer is manufactured from an insulation layer (ISiO2) applied on a support layer (TSi) of a first silicon wafer, wherein a region of the insulation layer (ISiO2) surrounded externally by a remaining edge of the insulation layer (ISiO2) forming the first insulating layer is removed, especially etched away by an etching method executed with buffered hydrofluoric acid (BHF);
  the first counterelectrode is manufactured from the support layer (TSi) of the first silicon wafer by introducing into the support layer (TSi) a hollow forming the opening of the first counterelectrode, especially etched in by means of deep reactive ion etching (DRIE) or by means of an etching method executed with potassium hydroxide (KOH);
  the insulation layer (ISiO2) of the first silicon wafer is connected in such a manner with the top layer (DSi) of the SOI wafer, especially connected by means of silicon fusion bonding, that the opening of the first counterelectrode is located over the measuring membrane;
  the top layer (DSi) of the SOI wafer is exposed by removing the support layer (TSi) of the SOI wafer, especially etched away by means of deep reactive ion etching (DRIE) or by means of an etching method executed with potassium hydroxide (KOH), and by removing an insulation layer (ISiO2) of the SOI wafer exposed thereby, especially etched away by an etching method executed with buffered hydrofluoric acid (BHF), by a reactive ion etching method (RIE) or by a deep reactive ion etching method (DRIE);
  the second insulating layer is manufactured from an insulation layer (ISiO2) applied on a support layer (TSi) of a second silicon wafer, wherein a region of the insulation layer (ISiO2) externally surrounded by a remaining edge of the insulation layer (ISiO2) forming the second insulating layer is removed, especially etched away by an etching method executed with buffered hydrofluoric acid (BHF);
  the second counterelectrode is manufactured from the support layer (TSi) of the second silicon wafer by introducing into the support layer (TSi) a hollow forming the opening of the second counterelectrode, especially etched in by means of deep reactive ion etching (DRIE) or an etching method executed with potassium hydroxide (KOH); and
  the second silicon wafer is connected in such a manner with the top layer (DSi) of the SOI wafer connected with the first silicon wafer, especially connected by silicon fusion bonding, that the the openings of the two counterelectrodes lie opposite one another on both sides of the measuring membrane.

12. The method as claimed in claim 11, wherein:
the inner region includes the connection region extending to the edge of the disk;
in the manufacturing of the second insulating layer a recess exposing at least a portion of the connection region is produced in the insulating layer; and
in the manufacturing of the second counterelectrode a recess in the second counterelectrode communicating with the recess in the insulating layer is produced.

13. The method as claimed in claim 11, wherein:
a plurality of equally constructed pressure difference sensors are manufactured in parallel on an undivided wafer, wherein the pressure difference sensors are manufactured pairwise next to one another in such a manner that:
the connection regions of the two pressure difference sensors of each pair adjoin one another;
the pressure difference sensors are constructed mirror symmetrically to a dividing line extending between the connection regions of the pairs, along which line the undivided wafer is separated in the case of final separating of the pressure difference sensors;
the mutually adjoining recesses in the second insulating layers of each pair are produced by removing a single continuous region of the insulation layer (ISiO2) of the second silicon wafer; and
the mutually adjoining recesses in the second counterelectrodes of each pair are produced by introducing a single hollow into the support layer (TSi) of the second silicon wafer.

* * * * *